United States Patent
Wang et al.

(10) Patent No.: US 11,511,774 B2
(45) Date of Patent: Nov. 29, 2022

(54) METHOD AND APPARATUS FOR CONTROLLING AUTONOMOUS DRIVING VEHICLE

(71) Applicant: Apollo Intelligent Driving Technology (Beijing) Co., Ltd., Beijing (CN)

(72) Inventors: Yue Wang, Beijing (CN); Zelin Wu, Beijing (CN); Jingjing Xue, Beijing (CN); Yingnan Liu, Beijing (CN); Wenlong Rao, Beijing (CN); Zijie Wang, Beijing (CN); Wei Gong, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/024,629

(22) Filed: Sep. 17, 2020

(65) Prior Publication Data

US 2021/0001887 A1    Jan. 7, 2021

Related U.S. Application Data

(63) Continuation of application No. PCT/CN2019/103252, filed on Aug. 29, 2019.

(30) Foreign Application Priority Data

Nov. 19, 2018   (CN) .......................... 201811374621.0

(51) Int. Cl.
*B60W 60/00*    (2020.01)
*B60W 10/18*    (2012.01)
(Continued)

(52) U.S. Cl.
CPC ........ *B60W 60/0016* (2020.02); *B60W 10/18* (2013.01); *B60W 40/08* (2013.01);
(Continued)

(58) Field of Classification Search
None
See application file for complete search history.

(56) References Cited

U.S. PATENT DOCUMENTS 9,725,036 B1 *  8/2017  Tarte .................... B60K 28/066
10,207,716 B2   2/2019  Liu
(Continued)

FOREIGN PATENT DOCUMENTS

CN    104875745 A    9/2015
CN    105976450 A    9/2016
(Continued)

*Primary Examiner* — James J Lee
*Assistant Examiner* — Andrew Sang Kim
(74) *Attorney, Agent, or Firm* — The Webb Law Firm

(57) ABSTRACT

A method and an apparatus for controlling an autonomous driving vehicle are provided. The method includes: receiving environment information sent by an autonomous driving vehicle, the environment information including vehicle exterior environment information; determining whether the autonomous driving vehicle is in an abnormal operation status, based on the vehicle exterior environment information and operation information of an operation executed by the autonomous driving vehicle; and sending a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle.

19 Claims, 4 Drawing Sheets

(51) Int. Cl.
  *B60W 40/08* (2012.01)
  *B60W 50/14* (2020.01)
  *B60W 50/00* (2006.01)

(52) U.S. Cl.
  CPC ........ *B60W 50/0098* (2013.01); *B60W 50/14* (2013.01); *B60W 2040/0818* (2013.01); *B60W 2420/42* (2013.01); *B60W 2530/00* (2013.01); *B60W 2540/26* (2013.01); *B60W 2555/00* (2020.02)

(56) References Cited

U.S. PATENT DOCUMENTS

| | | | |
|---|---|---|---|
| 10,618,526 | B2 | 4/2020 | Imai et al. |
| 10,953,830 | B1* | 3/2021 | Christensen ...... B60R 21/01554 |
| 2015/0248131 | A1* | 9/2015 | Fairfield ............... B60W 30/00 |
| | | | 701/2 |
| 2016/0090100 | A1 | 3/2016 | Oyama et al. |
| 2016/0139594 | A1 | 5/2016 | Okumura et al. |
| 2016/0378112 | A1 | 12/2016 | Ljubuncic et al. |
| 2017/0225689 | A1* | 8/2017 | Mukai ............... B60W 50/0097 |
| 2017/0308082 | A1 | 10/2017 | Ullrich et al. |
| 2017/0330044 | A1 | 11/2017 | Telpaz et al. |
| 2018/0095457 | A1* | 4/2018 | Lee .................... G08G 1/09623 |
| 2018/0284759 | A1 | 10/2018 | Michalakis et al. |
| 2018/0315314 | A1 | 11/2018 | Gilsenan et al. |
| 2019/0042738 | A1* | 2/2019 | Juliato .................. G06F 21/554 |
| 2019/0220011 | A1* | 7/2019 | Della Penna ............. G06F 8/65 |
| 2019/0300009 | A1* | 10/2019 | Sakamoto .......... B60W 50/0098 |
| 2019/0384289 | A1* | 12/2019 | Yeung .................. G05D 1/0088 |
| 2020/0290641 | A1 | 9/2020 | Kawakami |

FOREIGN PATENT DOCUMENTS

| | | |
|---|---|---|
| CN | 107123175 A | 9/2017 |
| CN | 107357194 A | 11/2017 |
| CN | 107415602 A | 12/2017 |
| CN | 107949504 A | 4/2018 |
| CN | 108162981 A | 6/2018 |
| DE | 102018110086 A1 | 10/2018 |
| EP | 3301530 A1 | 4/2018 |
| JP | 2015133050 A | 7/2015 |
| JP | 2017047835 A | 3/2017 |
| JP | 201863615 A | 4/2018 |
| JP | 6381835 B1 | 8/2018 |
| JP | 2018134949 A | 8/2018 |
| JP | 2018141812 A | 9/2018 |
| WO | WO-2019046204 A1 * 3/2019 ............ B60K 28/02 |

* cited by examiner

METHOD AND APPARATUS FOR CONTROLLING AUTONOMOUS DRIVING VEHICLE

CROSS-REFERENCE TO RELATED APPLICATIONS

This patent application is a continuation of International Application No. PCT/CN2019/103252, filed Aug. 29, 2019, and claims priority to Chinese Patent Application No. 201811374621.0, filed Nov. 19, 2018, the disclosures of which are hereby incorporated by reference in their entirety.

TECHNICAL FIELD

Embodiments of the present disclosure relate to the field of computer technology, and specifically to a method and apparatus for controlling an autonomous driving vehicle.

BACKGROUND

With the improvement of autonomous driving vehicle technology day by day, autonomous driving vehicles attract more and more attention. Autonomous driving vehicles can reduce problems caused by human mistakes (such as drunk driving, speeding, fatigue driving), and can also reduce the work intensity of vehicle drivers.

In order to ensure the safe driving of autonomous driving vehicles, it is necessary to monitor the status of a vehicle in real time and take emergency measures in time when the vehicle is abnormal, to ensure the personal and property safety of a passenger and reduce losses. In addition, when the autonomous driving vehicle is abnormal, it is necessary to acquire the black box data of the autonomous driving vehicle in time to process (e.g., analyze) the abnormity.

SUMMARY

Embodiments of the present disclosure propose a method and apparatus for controlling an autonomous driving vehicle.

In a first aspect, an embodiment of the present disclosure provides a method for controlling an autonomous driving vehicle. The method includes: receiving environment information sent by the autonomous driving vehicle, the environment information including vehicle exterior environment information; and sending a first control instruction to the autonomous driving vehicle, in response to determining that the autonomous driving vehicle does not include the predetermined passenger, wherein the first control instruction is used for controlling the autonomous driving vehicle to send alarm information.

In some embodiments, before the receiving environment information sent by an autonomous driving vehicle, the method further includes: receiving a vehicle control request sent by the autonomous driving vehicle.

In some embodiments, the environment information includes vehicle interior environment information, and the vehicle interior environment information includes vehicle interior video information; and the method further includes: determining whether the autonomous driving vehicle includes a predetermined passenger, based on the vehicle interior video information; and sending a first control instruction to the autonomous driving vehicle, in response to determining that the autonomous driving vehicle does not include the predetermined passenger, where the first control instruction is used for controlling the autonomous driving vehicle to send alarm information.

In some embodiments, the method further includes: determining whether the predetermined passenger is in an abnormal status, in response to determining that the autonomous driving vehicle includes the predetermined passenger; and sending a second control instruction to the autonomous driving vehicle, in response to determining that the predetermined passenger is in the abnormal status, where the second control instruction is used for controlling the autonomous driving vehicle to play preset prompt information.

In some embodiments, the environmental information includes vehicle interior environment information, and the vehicle interior environment information includes vehicle interior video information; and the method further includes: determining whether the autonomous driving vehicle includes a passenger with an abnormal behavior, based on the vehicle interior video information; and sending a third control instruction to the autonomous driving vehicle, in response to determining that the autonomous driving vehicle includes the passenger with the abnormal behavior, wherein the third control instruction is used for controlling the autonomous driving vehicle to execute a predetermined emergency operation for the passenger abnormal behavior.

In some embodiments, the environmental information includes vehicle interior environment information, and the vehicle interior environment information includes vehicle interior video information, vehicle interior smoke density information, and vehicle interior temperature information; and the method further includes: determining whether there is burning of objects in the autonomous driving vehicle, based on the vehicle interior video information, the vehicle interior smoke density information and/or the vehicle interior temperature information; and sending a fourth control instruction to the autonomous driving vehicle, in response to determining that there is burning of objects in the autonomous driving vehicle, wherein the fourth control instruction is used for controlling the autonomous driving vehicle to execute a predetermined emergency operation for burning of objects.

In a second aspect, an embodiment of the present disclosure provides an apparatus for controlling an autonomous driving vehicle. The apparatus includes: a first receiving unit, configured to receive environment information sent by the autonomous driving vehicle, the environment information including vehicle exterior environment information; a first determining unit, configured to determine whether the autonomous driving vehicle is in an abnormal operation status, based on the vehicle exterior environment information and operation information of an operation executed by the autonomous driving vehicle; and a sending unit, configured to send a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle.

In some embodiments, the apparatus further includes: a second receiving unit, configured to receive a vehicle control request sent by the autonomous driving vehicle.

In some embodiments, the environment information includes vehicle interior environment information, and the vehicle interior environment information includes vehicle interior video information; and the apparatus further includes: a second determining unit, configured to determine whether the autonomous driving vehicle includes a predetermined passenger, based on the vehicle interior video information; and a first control instruction sending unit, configured to send a first control instruction to the autonomous driving vehicle, in response to determining that the autonomous driving vehicle does not include the predetermined passenger, where the first control instruction is used for controlling the autonomous driving vehicle to send alarm information.

In some embodiments, the apparatus further includes: a third determining unit, configured to determine whether the predetermined passenger is in an abnormal status, in response to determining that the autonomous driving vehicle includes the predetermined passenger; and a second control instruction sending unit, configured to send a second control instruction to the autonomous driving vehicle, in response to determining that the predetermined passenger is in the abnormal status, wherein the second control instruction is used for controlling the autonomous driving vehicle to play preset prompt information.

In some embodiments, the environment information includes vehicle interior environment information, and the vehicle interior environment information includes vehicle interior video information; and the apparats further includes: a fourth determining unit, configured to determine whether the autonomous driving vehicle incudes a passenger with an abnormal behavior, based on the vehicle interior video information; and a third control instruction sending unit, configured to send a third control instruction to the autonomous driving vehicle, in response to determining that the autonomous driving vehicle includes the passenger with the abnormal behavior, where the third control instruction is used for controlling the autonomous driving vehicle to execute a predetermined emergency operation for the passenger abnormal behavior.

In some embodiments, the environmental information includes vehicle interior environment information, and the vehicle interior environment information includes vehicle interior video information, vehicle interior smoke density information, and vehicle interior temperature information; and the apparatus further includes a fifth determining unit, configured to determine whether there is burning of objects in the autonomous driving vehicle, based on the vehicle interior video information, the vehicle interior smoke density information and/or the vehicle interior temperature information; and a fourth control instruction sending unit, configured to send a fourth control instruction to the autonomous driving vehicle, in response to determining that there is burning of objects in the autonomous driving vehicle, where the fourth control instruction is used for controlling the autonomous driving vehicle to execute a predetermined emergency operation for burning of objects.

In a third aspect, an embodiment of the present disclosure provides a server, which includes: one or more processors; a storage apparatus storing one or more programs, which when executed by the two processors cause the one or more processors to implement the method described in any embodiment of the first aspect.

In a fourth aspect, an embodiment of the present disclosure provides a computer-readable medium storing a computer program, which when executed by a processor causes the processor d to implement the method described in any embodiment of the first aspect.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

According to the method and apparatus for controlling an autonomous driving vehicle provided by embodiments of the present disclosure, first environment information sent by an autonomous driving vehicle is received, the environment information including vehicle exterior environment information, then whether the autonomous driving vehicle is in an abnormal operation status is determined, based on the vehicle exterior environment information and an operation executed by the autonomous driving vehicle, and a braking control instruction and a data acquisition instruction are sent to the autonomous driving vehicle, in response to determining that the autonomous driving vehicle is in the abnormal operation status. Therefore, an autonomous driving vehicle is braked in a timely method when the autonomous driving vehicle is in an abnormal operation status, improving the safety thereof. Meanwhile, data of a driving recorder in the autonomous driving vehicle is acquired in time to improve the efficiency of processing an abnormity.

Figure 1:
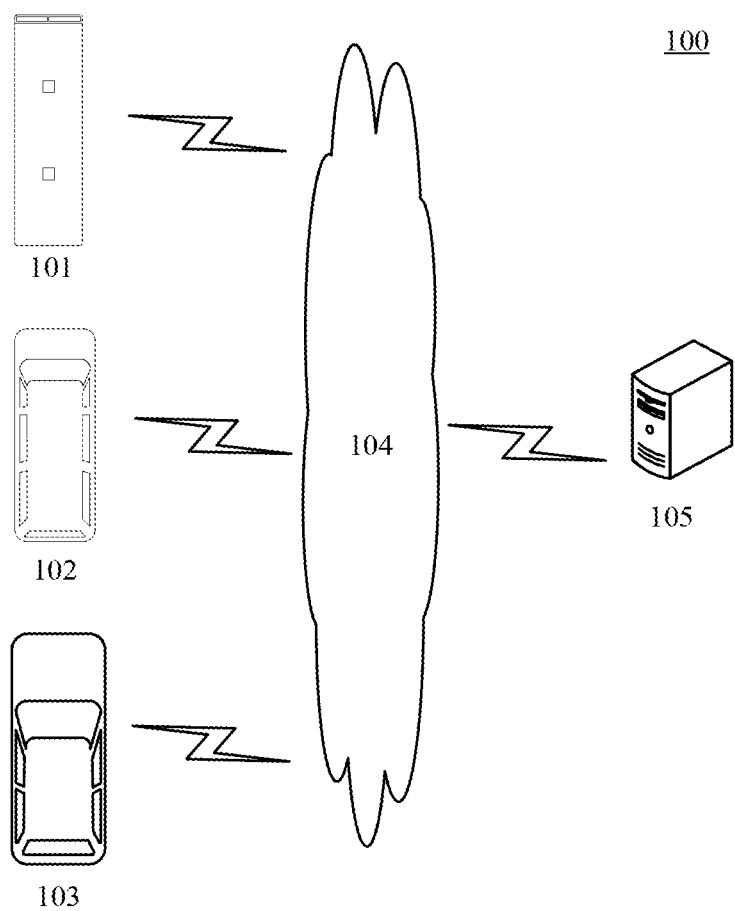
FIG. 1 is a diagram of an example system architecture in which an embodiment of the present disclosure may be applied.

FIG. 1 illustrates an example system architecture 100 of a method for controlling an autonomous driving vehicle or an apparatus for controlling an autonomous driving vehicle in which the embodiments of the present disclosure may be applied.

As shown in FIG. 1, the system architecture 100 may include autonomous driving vehicles 101, 102, 103, a network 104 and a server 105. The network 104 is used to provide a communication link medium between the autonomous driving vehicles 101, 102, 103 and the server 105. The network 104 may include various types of connections, such as wired, wireless communication links, or optic fibers.

The autonomous driving vehicles 101, 102, 103 interact with the server 105 through the network 104 to receive or send messages and the like. Various information acquisition apparatuses, such as image acquisition apparatuses, binocular cameras, radar detectors, or sensors, may be installed on the autonomous driving vehicles 101, 102, and 103. The above information acquisition apparatuses may be used to acquire vehicle exterior environment information and vehicle interior environment information of the autonomous driving vehicles 101, 102, 103. The autonomous driving vehicles 101, 102, 103 may alternatively be provided with vehicle-mounted intelligent brains. The vehicle-mounted intelligent brains may receive information acquired by the above information acquisition apparatuses, and process (e.g., analyze) the information, and then control the autonomous driving vehicles 101, 102, 103 to execute corresponding operations (for example, keep on driving, emergency stop, etc.) based on a processing result.

The autonomous driving vehicles 101, 102, 103 may be various types of vehicles, including but not limited to large passenger cars, motor tractors, city buses, medium passenger cars, large trucks, small cars, and the like.

The server 105 may be a server that provides various services, such as a backend server that processes environment information sent by the autonomous driving vehicles 101, 102, 103. The backend server may perform various analysis and processing on the received environment information, and send an instruction to the autonomous driving vehicles 101, 102, and 103 based on a processing result to control the autonomous driving vehicles 101, 102, and 103.

It should be noted that the server 105 may be hardware or software. When the server 105 is hardware, it may be implemented as a distributed server cluster composed of a plurality of servers, or as a single server. When the server 105 is software, it may be implemented as a plurality of software pieces or software modules (for example, for providing distributed services) or as a single software piece or software module, which is not specifically limited herein.

It should be noted that the method for controlling an autonomous driving vehicle provided by the embodiments of the present disclosure is generally performed by the server 105. Accordingly, the apparatus for controlling an autonomous driving vehicle is generally disposed in the server 105.

It should be understood that the number of vehicles, networks, and servers in FIG. 1 is merely illustrative. Depending on the implementation needs, there may be any number of vehicles, networks and servers.

Figure 2:
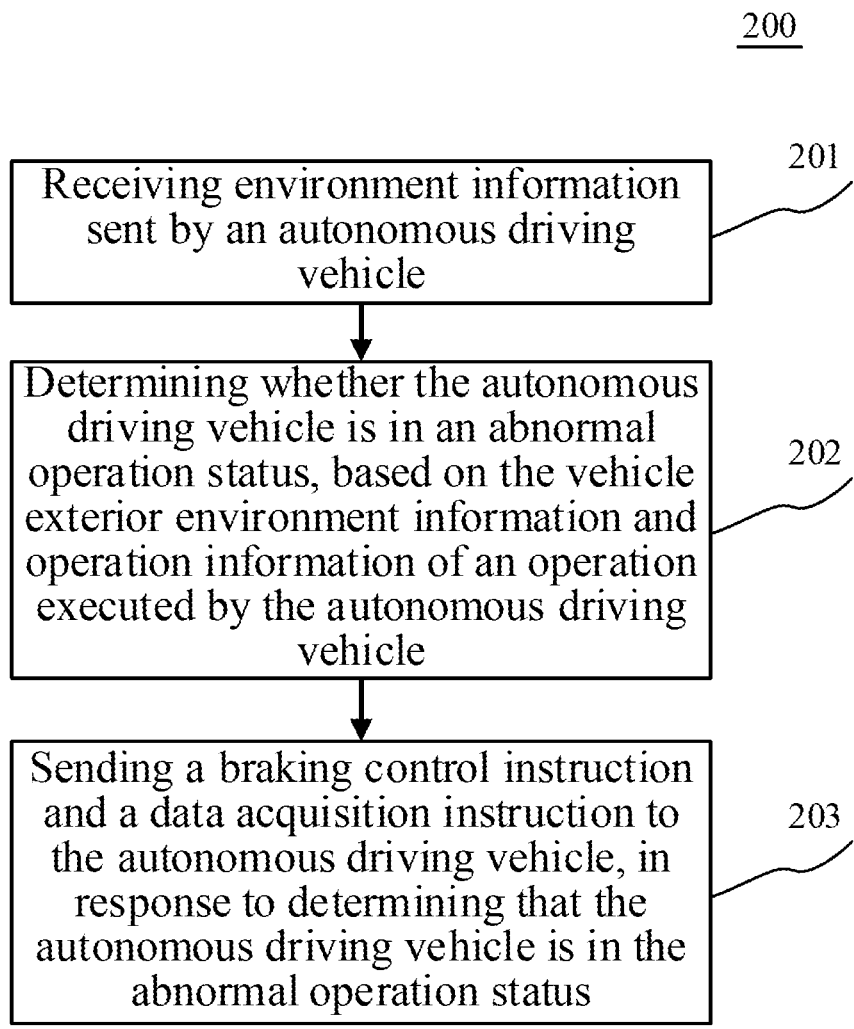
FIG. 2 is a flowchart of an embodiment of a method for controlling an autonomous driving vehicle according to the present disclosure.

With further reference to FIG. 2, a flow 200 of an embodiment of a method for controlling an autonomous driving vehicle according to the present disclosure is illustrated. The method for controlling an autonomous driving vehicle includes the following steps.

Step 201 includes receiving environment information sent by an autonomous driving vehicle.

In the present embodiment, an executing body of the method for controlling an autonomous driving vehicle (for example, the server shown in FIG. 1) may receive the environment information sent by the autonomous driving vehicle (for example, the autonomous driving vehicle 101, 102, 103 shown in FIG. 1) through a wireless connection. The environment information may include vehicle exterior environment information of the autonomous driving vehicle. The vehicle exterior environment information may be information about the vehicle exterior environment acquired by various information acquisition apparatuses arranged on the autonomous driving vehicle. For example, the vehicle exterior environment information may be information about the vehicle exterior environment acquired by a binocular camera or a radar detector arranged on the autonomous driving vehicle.

Step 202 includes determining whether the autonomous driving vehicle is in an abnormal operation status, based on the vehicle exterior environment information and an operation executed by the autonomous driving vehicle.

In the present embodiment, the autonomous driving vehicle needs to execute a variety of operations during traveling, such as acceleration, deceleration, braking, or turning. The autonomous driving vehicle may send operation information of the executed operation (for example, turning direction and angle, braking force, etc.) to the executing body in real time. In this way, the executing body may determine whether the autonomous driving vehicle is in the abnormal operation status based on the vehicle exterior environment information and the operation information of the operation executed by the autonomous driving vehicle received in step 201.

For example, the executing body may pre-store a corresponding relationship between the vehicle exterior environment information and the operation, or may pre-store a determination rule for determining the operation based on the vehicle exterior environment information. In this way, the executing body may predict an operation to be executed by the autonomous driving vehicle based on the vehicle exterior environment information sent by the autonomous driving vehicle, and use the predicted operation as a predictive operation. Then, the executing body may determine whether the predictive operation matches (for example, the same or similar) the operation (i.e., an actual operation) corresponding to the operation information sent by the autonomous driving vehicle. If the operations are not matched, it may be considered that the autonomous driving vehicle is in the abnormal operation status. For example, assuming that the vehicle exterior environment information includes obstacle (for example, building, pedestrian, other vehicles, etc.) information, such as the volume of an obstacle, or the distance to an obstacle. The executing body may predict an operation to be executed by the autonomous driving vehicle to avoid the obstacle based on the obstacle information, for example, turning a certain angle in a certain direction. Then, whether the predictive operation matches the actual operation of the autonomous driving vehicle may be determined. If the operations are not matched, for example, the predictive operation is "turning a certain angle in a certain direction", and the actual operation of the autonomous driving vehicle is "speeding up", it proves that the autonomous driving vehicle is in the abnormal operation status.

Step 203 includes sending a braking control instruction and a data acquisition instruction to the autonomous driving vehicle, in response to determining that the autonomous driving vehicle is in the abnormal operation status.

In the present embodiment, in response to determining that the autonomous driving vehicle is in the abnormal operation status, the executing body may send the braking control instruction and the data acquisition instruction to the autonomous driving vehicle.

Here, the braking control instruction may be used for controlling braking of the autonomous driving vehicle. For example, the executing body may send different braking control instructions to the autonomous driving vehicle based on a difference between the predictive operation and the actual operation. For example, when a deviation between the predictive operation and the actual operation is large, a braking control instruction for emergency braking may be sent to the autonomous driving vehicle. When the deviation between the predictive operation and the actual operation is small, a braking control instruction for slow braking may be sent to the autonomous driving vehicle. In practice, the executing body may also find the nearest parking spot using various methods (for example, querying a high-accuracy map) to control the autonomous driving vehicle to park in a safe location.

Here, the data acquisition instruction may be used for acquiring data of a driving recorder in the autonomous driving vehicle. The driving recorder, commonly known as car black box, is a digital electronic recording apparatus that records and stores vehicle driving speed, time, mileage and other status information related to vehicle driving and may realize data output through an interface. After acquiring the data of the driving recorder in the autonomous driving vehicle, the executing body may forward the acquired data to a preset device, for example, a terminal used by a technician who analyzes and processes the abnormal operation status of the autonomous driving vehicle. The executing body may also analyze and process the acquired data to obtain the cause for the abnormal operation of the autonomous driving vehicle, and display the obtained cause or send the obtained cause to the preset device.

In some alternative implementations of the present embodiment, the environment information may include vehicle interior environment information, and the vehicle interior environment information may include vehicle interior video information. The vehicle interior video information may be a video acquired by a video acquisition apparatus arranged on the autonomous driving vehicle. The method for controlling an autonomous driving vehicle may further include the following content.

First, the executing body may determine whether the autonomous driving vehicle includes a predetermined passenger, based on the vehicle interior video information.

In the present implementation, the predetermined passenger may refer to a person responsible for the safety of the autonomous driving vehicle on the autonomous driving vehicle, for example, a safety officer. In practice, in order to ensure the safety of public places, generally safety officers are arranged on city buses, passenger cars and other buses, and the safety officers may wear uniforms. For example, face information of the predetermined passenger may be pre-stored in the executing body. In this regard, the executing body may perform face detection, face recognition and other processing on passengers in the vehicle interior video information. Whether the predetermined passenger is in the autonomous driving vehicle is determined based on a processing result. It should be noted that processing such as face detection or face recognition is a well-known technology that is currently widely studied and applied, and detailed description thereof will be omitted.

Then, the executing body may send a first control instruction to the autonomous driving vehicle, in response to determining that the autonomous driving vehicle does not include the predetermined passenger.

In the present implementation, the executing body may send the first control instruction to the autonomous driving vehicle, in response to determining that the autonomous driving vehicle does not include the predetermined passenger. Here, the first control instruction may be used for controlling the autonomous driving vehicle to send alarm information. For example, the first control instruction may be used for controlling the autonomous driving vehicle to send alarm information to a predetermined device (for example, a terminal used by relevant personnel responsible for vehicle safety) to notify a device end user that there is no predetermined passenger in the autonomous driving vehicle. Here, the above alarm information may include information such as the identification and the location of the autonomous driving vehicle, and generally relevant personnel may quickly locate the autonomous driving vehicle. Through the present implementation, the autonomous driving vehicle can be controlled to send the alarm information in time after determining that the autonomous driving vehicle lacks the predetermined passenger, thereby improving the safety of the autonomous driving vehicle.

In some alternative implementations, the method for controlling an autonomous driving vehicle may also include the following content.

First, whether the predetermined passenger is in an abnormal status is determined, in response to determining that the autonomous driving vehicle includes the predetermined passenger.

In the present implementation, in response to determining that the autonomous driving vehicle includes the predetermined passenger, the executing body may further determine whether the predetermined passenger is in the abnormal status. For example, the executing body may perform human action recognition on the predetermined passenger based on the vehicle interior video information, thereby recognizing an action of the predetermined passenger. Based on the recognized action, whether the predetermined passenger is in an abnormal status is determined. Here, the abnormal status may refer to a non-working status of performing actions such as using a mobile phone or sleeping. It should be noted that human action recognition is a well-known technology that is currently widely studies and applied, and detailed description thereof will be omitted.

Then, a second control instruction is sent to the autonomous driving vehicle, in response to determining that the predetermined passenger is in the abnormal status. Here, the second control instruction may be used for controlling the autonomous driving vehicle to play preset prompt information. The prompt information may be used for prompting the predetermined passenger that he/she is in the abnormal status, which may cause the autonomous driving vehicle and other passengers to be in unsafe status. Through the present implementation, the predetermined passenger may be prompted in time when the predetermined passenger is in an abnormal status, thereby improving the safety of the autonomous driving vehicle and other passengers.

In some alternative implementations of the present embodiment, the environment information may include vehicle interior environment information, and the vehicle interior environment information may include vehicle interior video information.

The method for controlling an autonomous driving vehicle may further include following content.

First, whether the autonomous driving vehicle includes a passenger with an abnormal behavior is determined, based on the vehicle interior video information. For example, the executing body may recognize an action of each passenger in the autonomous driving vehicle based on the above vehicle interior video information, and determine whether any passenger has made a predetermined abnormal action (such as a dangerous action) based on the action. If there is a passenger that makes a predetermined abnormal action, the passenger is determined to be a passenger with the abnormal behavior.

Then, in response to determining that the autonomous driving vehicle includes the passenger with the abnormal behavior, the executing body may send a third control instruction to the autonomous driving vehicle. Here, the third control instruction may be used for controlling the autonomous driving vehicle to execute a predetermined emergency operation for the passenger abnormal behavior. For example, the emergency operation for the abnormal behavior may be preset, for example, sending alarm information including the identification and the location of the vehicle to the public safety agency.

In some alternative implementations of the present embodiment, the environment information may include vehicle interior environment information, and the vehicle interior environment information may include vehicle interior video information, vehicle interior smoke density information, and vehicle interior temperature information.

The method for controlling an autonomous driving vehicle may further include following content.

First, the executing body may determine whether there is burning of objects in the autonomous driving vehicle, based on the vehicle interior video information, the vehicle interior smoke density information and/or the vehicle interior temperature information. Here, the vehicle interior smoke density information and the vehicle interior temperature information may be acquired by sensors arranged on the autonomous driving vehicle. For example, the executing body may detect whether there is a flame in the autonomous driving vehicle based on the vehicle interior video information, and determine whether there is burning of objects in the autonomous driving vehicle based on a flame detection result, the vehicle interior smoke density information and/or the vehicle interior temperature information. It is not difficult to understand that, according to actual needs, the executing body may determine whether there is burning of objects based on one of the vehicle interior video information, the vehicle interior smoke density information and the vehicle interior temperature information, or determine whether there is burning of objects based on two of the vehicle interior video information, the vehicle interior smoke density information and the vehicle interior temperature information, and determine whether there is burning of objects by combining all of the vehicle interior video information, the vehicle interior smoke density information and the vehicle interior temperature information.

Then, the executing body may send a fourth control instruction to the autonomous driving vehicle, in response to determining that there is burning of objects in the autonomous driving vehicle. Here, the fourth control instruction may be used for controlling the autonomous driving vehicle to execute a predetermined emergency operation for burning of objects. For example, the emergency operation for burning of objects may be preset, for example, sending object burning alarm information including the identification and the location of the vehicle, to the fire department.

Figure 3:
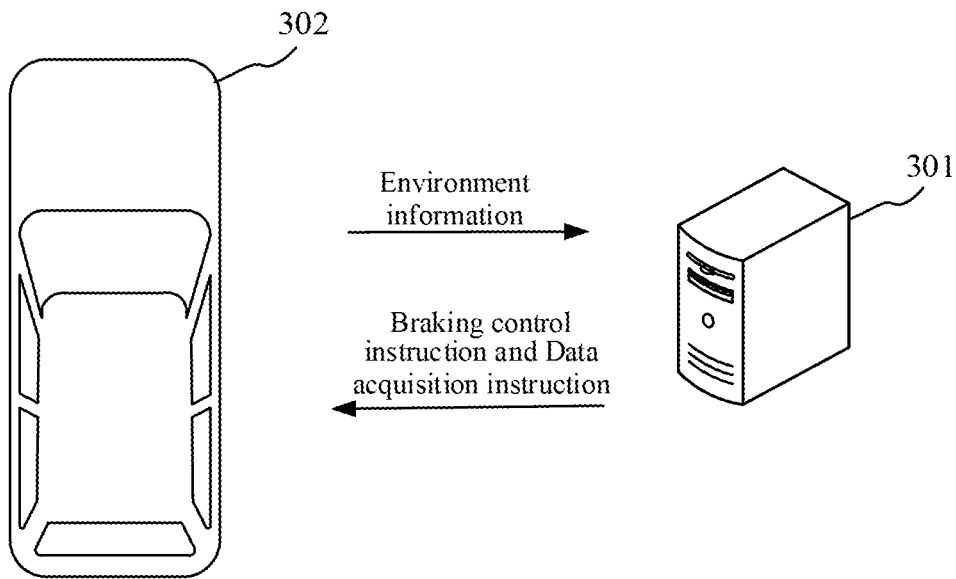
FIG. 3 is a schematic diagram of an application scenario of the method for controlling an autonomous driving vehicle according to the present disclosure.

With further reference to FIG. 3, FIG. 3 is a schematic diagram of an application scenario of the method for controlling an autonomous driving vehicle according to the present embodiment. In the application scenario of FIG. 3, a server 301 receives environment information sent by an autonomous driving vehicle 302, where the environment information includes vehicle exterior environment information. Then, the server 301 determines whether the autonomous driving vehicle 302 is in an abnormal operation status based on the vehicle exterior environment information and operation information of an operation executed by the autonomous driving vehicle 302. Finally, in response to determining that the autonomous driving vehicle 302 is in the abnormal operation status, the server 301 sends a braking control instruction and a data acquisition instruction to the autonomous driving vehicle 302, where the braking control instruction is used for controlling braking of the autonomous driving vehicle, and the data acquisition instruction is used for acquiring data of a driving recorder in the autonomous driving vehicle.

The method provided by the above embodiment of the present disclosure realizes that an autonomous driving vehicle is braked in a timely method when the autonomous driving vehicle is in an abnormal operation status, improving the safety. Meanwhile, data of a driving recorder in the autonomous driving vehicle is acquired in time to improve the efficiency of processing an abnormity.

Figure 4:
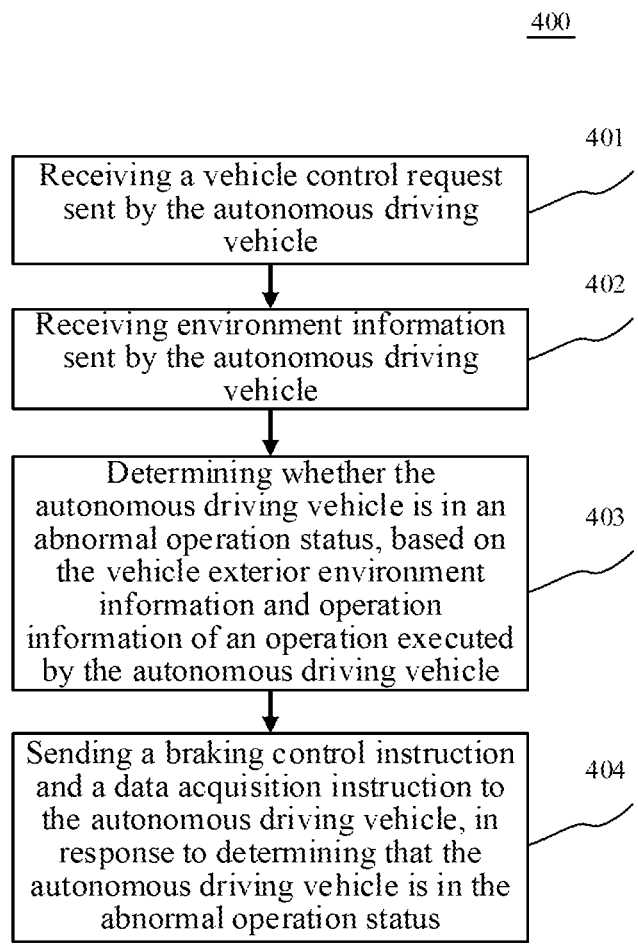
FIG. 4 is a flowchart of another embodiment of the method for controlling an autonomous driving vehicle according to the present disclosure.

With further reference to FIG. 4, a flow 400 of another embodiment of the method for controlling an autonomous driving vehicle is illustrated. The flow 400 of the method for controlling an autonomous driving vehicle includes the following steps.

Step 401 includes receiving a vehicle control request sent by the autonomous driving vehicle.

In the present embodiment, an executing body of the method for controlling an autonomous driving vehicle (for example, the server 105 shown in FIG. 1) may receive the vehicle control request sent by the autonomous driving vehicle (for example, the autonomous driving vehicles 101, 102, 103 shown in FIG. 1) through a wireless connection. Here, the vehicle control request is used for requesting the executing body to control the autonomous driving vehicle. As an example, the vehicle control request may be sent by a passenger in the autonomous driving vehicle by triggering a preset apparatus (for example, a preset button). For example, when a passenger senses that the autonomous driving vehicle is driving abnormally, he/she may trigger the preset apparatus to request the executing body to control the autonomous driving vehicle from the cloud to ensure the driving safety of the autonomous driving vehicle. As another example, the vehicle control request may be sent by the autonomous driving vehicle. For example, when the autonomous driving vehicle determines that the autonomous driving vehicle is driving abnormally based on vehicle parameters (for example, acceleration, speed, etc.), the autonomous driving vehicle may send a vehicle control request to the executing body to request the executing body to control the autonomous driving vehicle from the cloud to ensure the driving safety of the autonomous driving vehicle.

Step 402 includes receiving environment information sent by the autonomous driving vehicle.

In the present embodiment, step 402 is similar to step 201 of the embodiment shown in FIG. 2, and detailed description thereof will be omitted.

Step 403 includes determining whether the autonomous driving vehicle is in an abnormal operation status, based on the vehicle exterior environment information and operation information of an operation executed by the autonomous driving vehicle.

In the present embodiment, step 403 is similar to step 202 of the embodiment shown in FIG. 2, and detailed description thereof will be omitted.

Step 404 includes sending a braking control instruction and a data acquisition instruction to the autonomous driving vehicle, in response to determining that the autonomous driving vehicle is in the abnormal operation status.

In the present embodiment, step 404 is similar to step 203 of the embodiment shown in FIG. 2, and detailed description thereof will be omitted.

It can be seen from FIG. 4 that, compared with the embodiment corresponding to FIG. 2, the flow 400 of the method for controlling an autonomous driving vehicle in the present embodiment highlights the step of receiving a vehicle control request sent by the autonomous driving vehicle. Therefore, the solution described in the present embodiment may control the autonomous driving vehicle that sends the vehicle control request, in this regard, the executing body may quickly determine the autonomous driving vehicle that needs to be controlled, so that the control is more targeted and the control efficiency is improved.

Figure 5:
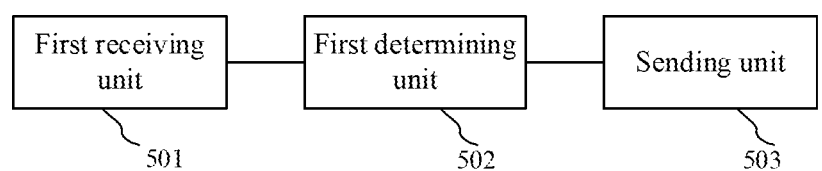
FIG. 5 is a schematic structural diagram of an embodiment of an apparatus for controlling an autonomous driving vehicle according to the present disclosure.

With further reference to FIG. 5, as an implementation of the method shown in the above figures, the present disclosure provides an embodiment of an apparatus for controlling an autonomous driving vehicle, and the apparatus embodiment corresponds to the method embodiment as shown in FIG. 2, and the apparatus may be specifically applied to various electronic devices.

As shown in FIG. 5, an apparatus 500 for controlling an autonomous driving vehicle of the present embodiment includes: a first receiving unit 501, a first determining unit 502 and a sending unit 503. The first receiving unit 501 is configured to receive environment information sent by an autonomous driving vehicle, the environment information including vehicle exterior environment information. The first determining unit 502 is configured to determine whether the autonomous driving vehicle is in an abnormal operation status, based on the vehicle exterior environment information and operation information of an operation executed by the autonomous driving vehicle. The sending unit 503 is configured to send a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle.

In the present embodiment, the specific processing and the technical effects thereof of the first receiving unit 501, the first determining unit 502 and the sending unit 503 of the apparatus 500 for controlling an autonomous driving vehicle may refer to the related descriptions of step 201, step 202 and step 203 in the corresponding embodiment of FIG. 2 respectively, and detailed description thereof will be omitted.

In some alternative implementations of the present embodiment, the apparatus 500 further includes: a second receiving unit (not shown in the figure), configured to receive a vehicle control request sent by the autonomous driving vehicle.

In some alternative implementations of the present embodiment, the environment information includes vehicle interior environment information, and the vehicle interior environment information includes vehicle interior video information; and the apparatus 500 further includes: a second determining unit (not shown in the figure), configured to determine whether the autonomous driving vehicle includes a predetermined passenger, based on the vehicle interior video information; and a first control instruction sending unit (not shown in the figure), configured to send a first control instruction to the autonomous driving vehicle, in response to determining that the autonomous driving vehicle does not include the predetermined passenger, where the first control instruction is used for controlling the autonomous driving vehicle to send alarm information.

In some alternative implementations of the present embodiment, the apparatus 500 further includes: a third determining unit (not shown in the figure), configured to determine whether the predetermined passenger is in an abnormal status, in response to determining that the autonomous driving vehicle includes the predetermined passenger; and a second control instruction sending unit (not shown in the figure), configured to send a second control instruction to the autonomous driving vehicle, in response to determining that the predetermined passenger is in the abnormal status, where the second control instruction is used for controlling the autonomous driving vehicle to play preset prompt information.

In some alternative implementations of the present embodiment, the environment information includes vehicle interior environment information, and the vehicle interior environment information includes vehicle interior video information; and the apparatus 500 further includes: a fourth determining unit (not shown in the figure), configured to determine whether the autonomous driving vehicle includes a passenger with an abnormal behavior, based on the vehicle interior video information; and a third control instruction sending unit (not shown in the figure), configured to send a third control instruction to the autonomous driving vehicle, in response to determining that the autonomous driving vehicle includes the passenger with the abnormal behavior, where the third control instruction is used for controlling the autonomous driving vehicle to execute a predetermined emergency operation for the passenger abnormal behavior.

In some alternative implementations of the present embodiment, the environment information includes vehicle interior environment information, and the vehicle interior environment information includes vehicle interior video information, vehicle interior smoke density information, and vehicle interior temperature information; and the apparatus 500 further includes: a fifth determining unit (not shown in the figure), configured to determine whether there is burning of objects in the autonomous driving vehicle, based on the vehicle interior video information, the vehicle interior smoke density information and/or the vehicle interior temperature information; and a fourth control instruction sending unit (not shown in the figure), configured to send a fourth control instruction to the autonomous driving vehicle, in response to determining that there is burning of objects in the autonomous driving vehicle, where the fourth control instruction is used for controlling the autonomous driving vehicle to execute a predetermined emergency operation for burning of objects.

Figure 6:
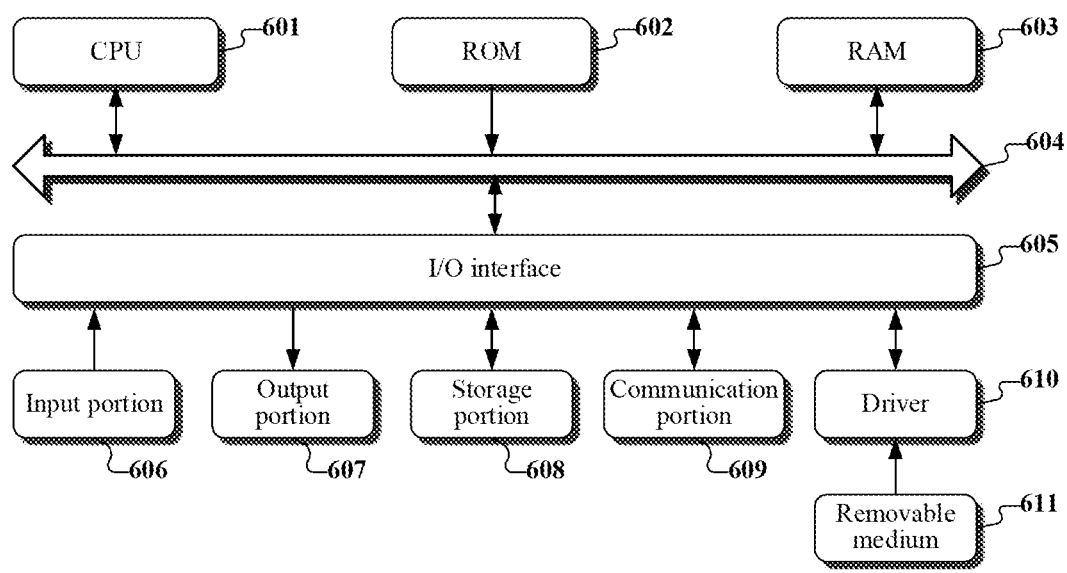
FIG. 6 is a schematic structural diagram of a computer system of a server adapted for implementing the embodiments of the present disclosure.

With further reference to FIG. 6, a schematic structural diagram of a computer system 600 of a server adapted for implementing the embodiments of the present disclosure is shown. The server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: an input portion 606 including a keyboard, a mouse and the like; an output portion 607 including a cathode ray tube (CRT), a liquid crystal display (LCD), a speaker and the like; the storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a first receiving unit, a first determining unit and a sending unit. Here, the names of these units do not in some cases constitute limitations to such units themselves. For example, the first receiving unit may also be described as "a unit configured to receive environment information sent by an autonomous driving vehicle".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive environment information sent by an autonomous driving vehicle, the environment information including vehicle exterior environment information; determine whether the autonomous driving vehicle is in an abnormal operation status, based on the vehicle exterior environment information and operation information of an operation executed by the autonomous driving vehicle; and send a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling an autonomous driving vehicle, comprising:
    receiving environment information sent by the autonomous driving vehicle, the environment information comprising vehicle exterior environment information;
    determining whether the autonomous driving vehicle is in an abnormal operation status, based on the vehicle exterior environment information and operation information of an operation executed by the autonomous driving vehicle; and
    sending a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle,
    wherein determining whether the autonomous driving vehicle is in an abnormal operation status comprises:
    by using a pre-stored corresponding relationship between vehicle exterior environment information and an operation or a pre-stored determination rule for determining an operation based on vehicle exterior environment information, predicting a predictive operation to be executed by the autonomous driving vehicle based on the vehicle exterior environment information sent by the autonomous driving vehicle, for determining whether the autonomous driving vehicle is in an abnormal operation status; and
    determining the autonomous driving vehicle is in an abnormal operation status in response to determining that the predictive operation is not matched with the operation corresponding to the operation information; and
    wherein sending a braking control instruction comprises:
    determining a difference between the predictive operation and the operation corresponding to the operation information;
    sending a braking control instruction for emergency braking or slow braking to the autonomous driving vehicle based on the difference.

2. The method according to claim 1, wherein, before the receiving environment information sent by an autonomous driving vehicle, the method further comprises:
    receiving a vehicle control request sent by the autonomous driving vehicle.

3. The method according to claim 1, wherein the environment information comprises vehicle interior environment information, and the vehicle interior environment information comprises vehicle interior video information; and
    the method further comprises:
    determining whether the autonomous driving vehicle comprises a predetermined passenger, based on the vehicle interior video information; and
    sending a first control instruction to the autonomous driving vehicle, in response to determining that the autonomous driving vehicle does not comprise the predetermined passenger, wherein the first control instruction is used for controlling the autonomous driving vehicle to send alarm information.

4. The method according to claim 3, wherein the method further comprises:
    determining whether the predetermined passenger is in an abnormal status, in response to determining that the autonomous driving vehicle comprises the predetermined passenger; and
    sending a second control instruction to the autonomous driving vehicle, in response to determining that the predetermined passenger is in the abnormal status, wherein the second control instruction is used for controlling the autonomous driving vehicle to play preset prompt information.

5. The method according to claim 1, wherein the environment information comprises vehicle interior environment information, and the vehicle interior environment information comprises vehicle interior video information; and
    the method further comprises:
    determining whether the autonomous driving vehicle comprises a passenger with an abnormal behavior, based on the vehicle interior video information; and
    sending a third control instruction to the autonomous driving vehicle, in response to determining that the autonomous driving vehicle comprises the passenger with the abnormal behavior, wherein the third control instruction is used for controlling the autonomous driving vehicle to execute a predetermined emergency operation for the passenger abnormal behavior.

6. The method according to claim 1, wherein the environment information comprises vehicle interior environment information, and the vehicle interior environment information comprises vehicle interior video information, vehicle interior smoke density information, and vehicle interior temperature information; and
    the method further comprises:
    determining whether there is burning of objects in the autonomous driving vehicle, based on the vehicle interior video information, the vehicle interior smoke density information and/or the vehicle interior temperature information; and
    sending a fourth control instruction to the autonomous driving vehicle, in response to determining that there is burning of objects in the autonomous driving vehicle, wherein the fourth control instruction is used for controlling the autonomous driving vehicle to execute a predetermined emergency operation for burning of objects.

7. The method according to claim 1, wherein in response to a predictive operation not matching the actual operation corresponding to the operation information, it is determined that the autonomous driving vehicle is in the abnormal operation status, the predictive operation being an operation needed to be performed by the autonomous driving vehicle and predicted based on the vehicle exterior environment information.

8. A server, comprising:
    one or more processors; and
    a storage apparatus, storing one or more programs, wherein the one or more programs, when executed by the one or more processors, cause the one or more processors to perform operations, the operations comprising:
receiving environment information sent by the autonomous driving vehicle, the environment information comprising vehicle exterior environment information;
determining whether the autonomous driving vehicle is in an abnormal operation status, based on the vehicle exterior environment information and operation information of an operation executed by the autonomous driving vehicle; and
sending a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle,
wherein determining whether the autonomous driving vehicle is in an abnormal operation status comprises:
by using a pre-stored corresponding relationship between vehicle exterior environment information and an operation or a pre-stored determination rule for determining an operation based on vehicle exterior environment information, predicting a predictive operation to be executed by the autonomous driving vehicle based on the vehicle exterior environment information sent by the autonomous driving vehicle, for determining whether the autonomous driving vehicle is in an abnormal operation status; and
determining the autonomous driving vehicle is in an abnormal operation status in response to determining that the predictive operation is not matched with the operation corresponding to the operation information; and
wherein sending a braking control instruction comprises:
determining a difference between the predictive operation and the operation corresponding to the operation information;
sending a braking control instruction for emergency braking or slow braking to the autonomous driving vehicle based on the difference.

9. The server according to claim 8, wherein, before the receiving environment information sent by an autonomous driving vehicle, the operations further comprise:
receiving a vehicle control request sent by the autonomous driving vehicle.

10. The server according to claim 8, wherein the environment information comprises vehicle interior environment information, and the vehicle interior environment information comprises vehicle interior video information; and
the operations further comprise:
determining whether the autonomous driving vehicle comprises a predetermined passenger, based on the vehicle interior video information; and
sending a first control instruction to the autonomous driving vehicle, in response to determining that the autonomous driving vehicle does not comprise the predetermined passenger, wherein the first control instruction is used for controlling the autonomous driving vehicle to send alarm information.

11. The server according to claim 10, wherein the operations further comprise:
determining whether the predetermined passenger is in an abnormal status, in response to determining that the autonomous driving vehicle comprises the predetermined passenger; and
sending a second control instruction to the autonomous driving vehicle, in response to determining that the predetermined passenger is in the abnormal status, wherein the second control instruction is used for controlling the autonomous driving vehicle to play preset prompt information.

12. The server according to claim 8, wherein the environment information comprises vehicle interior environment information, and the vehicle interior environment information comprises vehicle interior video information; and
the operations further comprise:
determining whether the autonomous driving vehicle comprises a passenger with an abnormal behavior, based on the vehicle interior video information; and
sending a third control instruction to the autonomous driving vehicle, in response to determining that the autonomous driving vehicle comprises the passenger with the abnormal behavior, wherein the third control instruction is used for controlling the autonomous driving vehicle to execute a predetermined emergency operation for the passenger abnormal behavior.

13. The server according to claim 8, wherein the environment information comprises vehicle interior environment information, and the vehicle interior environment information comprises vehicle interior video information, vehicle interior smoke density information, and vehicle interior temperature information; and
the operations further comprise:
determining whether there is burning of objects in the autonomous driving vehicle, based on the vehicle interior video information, the vehicle interior smoke density information and/or the vehicle interior temperature information; and
sending a fourth control instruction to the autonomous driving vehicle, in response to determining that there is burning of objects in the autonomous driving vehicle, wherein the fourth control instruction is used for controlling the autonomous driving vehicle to execute a predetermined emergency operation for burning of objects.

14. A non-transitory computer readable medium, storing a computer program thereon, wherein the program, when executed by a processor, causes the processor to perform operations, the operations comprising:
receiving environment information sent by the autonomous driving vehicle, the environment information comprising vehicle exterior environment information;
determining whether the autonomous driving vehicle is in an abnormal operation status, based on the vehicle exterior environment information and operation information of an operation executed by the autonomous driving vehicle; and
sending a braking control instruction and a data acquisition instruction to the autonomous driving vehicle, in response to determining that the autonomous driving vehicle is in the abnormal operation status, the braking control instruction being used for controlling braking of the autonomous driving vehicle, and the data acquisition instruction being used for acquiring data of a driving recorder in the autonomous driving vehicle,
wherein determining whether the autonomous driving vehicle is in an abnormal operation status comprises:

by using a pre-stored corresponding relationship between vehicle exterior environment information and an operation or a pre-stored determination rule for determining an operation based on vehicle exterior environment information, predicting a predictive operation to be executed by the autonomous driving vehicle based on the vehicle exterior environment information sent by the autonomous driving vehicle, for determining whether the autonomous driving vehicle is in an abnormal operation status; and determining the autonomous driving vehicle is in an abnormal operation status in response to determining that the predictive operation is not matched with the operation corresponding to the operation information; and wherein sending a braking control instruction comprises:

determining a difference between the predictive operation and the operation corresponding to the operation information;

sending a braking control instruction for emergency braking or slow braking to the autonomous driving vehicle based on the difference.

15. The computer readable medium according to claim 14, wherein, before the receiving environment information sent by an autonomous driving vehicle, the operations further comprise:

receiving a vehicle control request sent by the autonomous driving vehicle.

16. The computer readable medium according to claim 14, wherein the environment information comprises vehicle interior environment information, and the vehicle interior environment information comprises vehicle interior video information; and the operations further comprise:

determining whether the autonomous driving vehicle comprises a predetermined passenger, based on the vehicle interior video information; and sending a first control instruction to the autonomous driving vehicle, in response to determining that the autonomous driving vehicle does not comprise the predetermined passenger, wherein the first control instruction is used for controlling the autonomous driving vehicle to send alarm information.

17. The computer readable medium according to claim 14, wherein the operations further comprise:

determining whether the predetermined passenger is in an abnormal status, in response to determining that the autonomous driving vehicle comprises the predetermined passenger; and sending a second control instruction to the autonomous driving vehicle, in response to determining that the predetermined passenger is in the abnormal status, wherein the second control instruction is used for controlling the autonomous driving vehicle to play preset prompt information.

18. The computer readable medium according to claim 14, wherein the environment information comprises vehicle interior environment information, and the vehicle interior environment information comprises vehicle interior video information; and the operations further comprise:

determining whether the autonomous driving vehicle comprises a passenger with an abnormal behavior, based on the vehicle interior video information; and sending a third control instruction to the autonomous driving vehicle, in response to determining that the autonomous driving vehicle comprises the passenger with the abnormal behavior, wherein the third control instruction is used for controlling the autonomous driving vehicle to execute a predetermined emergency operation for the passenger abnormal behavior.

19. The computer readable medium according to claim 14, wherein the environment information comprises vehicle interior environment information, and the vehicle interior environment information comprises vehicle interior video information, vehicle interior smoke density information, and vehicle interior temperature information; and the operations further comprise:

determining whether there is burning of objects in the autonomous driving vehicle, based on the vehicle interior video information, the vehicle interior smoke density information and/or the vehicle interior temperature information; and sending a fourth control instruction to the autonomous driving vehicle, in response to determining that there is burning of objects in the autonomous driving vehicle, wherein the fourth control instruction is used for controlling the autonomous driving vehicle to execute a predetermined emergency operation for burning of objects.

\* \* \* \* \*